US008990889B2

(12) United States Patent
Van Till et al.

(10) Patent No.: US 8,990,889 B2
(45) Date of Patent: *Mar. 24, 2015

(54) SYSTEM AND METHOD FOR PHYSICAL ACCESS CONTROL

(71) Applicant: Brivo Systems, Inc., Bethesda, MD (US)

(72) Inventors: Steven Van Till, Bethesda, MD (US); Eoin Cosgrave, Bethesda, MD (US)

(73) Assignee: Brivo Systems, Inc., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,218

(22) Filed: Oct. 21, 2014

(65) Prior Publication Data

US 2015/0040205 A1 Feb. 5, 2015

Related U.S. Application Data

(63) Continuation of application No. 14/211,494, filed on Mar. 14, 2014, now Pat. No. 8,881,252.

(60) Provisional application No. 61/782,007, filed on Mar. 14, 2013.

(51) Int. Cl.
*H04L 9/32* (2006.01)

(52) U.S. Cl.
CPC ..................................... *H04L 9/3234* (2013.01)
USPC ........................... 726/2; 726/4; 726/5; 726/9

(58) Field of Classification Search
CPC ..... H04L 63/08; H04L 63/0853; H04L 63/10; H04L 9/3234; G06F 21/31; G06F 21/34
USPC .............. 726/1–5, 7, 9, 27–30; 713/168, 182, 713/185, 193–194
See application file for complete search history.

(56) References Cited

U.S. PATENT DOCUMENTS

| | | | | |
|---|---|---|---|---|
| 6,643,783 | B2 * | 11/2003 | Flyntz | 726/9 |
| 7,509,499 | B2 * | 3/2009 | von Mueller et al. | 713/185 |
| 7,512,655 | B2 * | 3/2009 | Armstrong et al. | 709/205 |
| 7,802,294 | B2 * | 9/2010 | Perlin et al. | 726/9 |
| 8,881,252 | B2 * | 11/2014 | Van Till et al. | 726/7 |

* cited by examiner

*Primary Examiner* — Hosuk Song
(74) *Attorney, Agent, or Firm* — Williams Mullen, PC; Thomas F. Bergert

(57) ABSTRACT

The present invention provides, in one aspect, a system and method for managing authentication tokens that operate across multiple types or physical resources binding the tokens to one or more external electronic Identity Providers; generating tokens; authenticating the tokens at multiple physical resources; managing access to physical resources by linking the tokens to the electronic identities; translating the tokens to the appropriate physical token type based on infrastructure services available at the point of service; validating tokens at the physical resource; tracking and conveying usage information; and making use of social group relationships and other data defined by individual usage to, among other things, simplify the process of granting user-generated credentials to persons connected to a given individual via the Identity Provider or an external social network, for example.

17 Claims, 6 Drawing Sheets

SYSTEM AND METHOD FOR PHYSICAL ACCESS CONTROL

FIELD OF THE INVENTION

The present invention relates to access control and identity management, and more particularly to a system and method for unifying physical access control via public identity providers and social networks.

BACKGROUND OF THE INVENTION

Nearly all access control mechanisms for managing physical "points of service" or other physical resource access control methods and apparatus operate only within the scope and confines of a single building, organization, or enterprise. For commercial access management, this restriction is usually not material with respect to the usefulness of the access control mechanisms.

For a consumer population, however, this restriction results in the need for having multiple types of tokens, each of which operates at only a single facility or institution. This is somewhat similar to how consumers access online resources. Whereas one individual may have dozens of user names and passwords to access online resources, such as e-mail accounts, bank accounts, brokerage accounts, shopping websites, etc., the individual may also have multiple different physical access mechanisms through which he or she can access physical resources, such as a key to a house, a card for a parking facility, a fob for an employer's building, a combination for a storage locker, etc. The proliferation of these different physical mechanisms (e.g., tokens) and the difficulty of managing them uniformly is inconvenient for the consumer, and weakens the security mechanisms put in place for the facilities under management. Furthermore, there is no practical means of linking the individual identity assumed by the consumer at each institution with the identities asserted at the others. An additional complication is that a variety of token technologies make it extremely difficult to have continuity of identity across multiple facilities or physical points of service.

Heterogeneous credential management, tokenization, and physical token exchange mechanisms (e.g., readers, scanners, keypads) are therefore the central challenges for establishing a widely usable access management solution with continuity of identity across multiple contexts. There is currently no solution that permits a user to present the same identity for physical access control in connection with different points of service, wherein the different points of service require different physical tokens in order to gain access control through the appropriate authentication apparatus present at each point of service.

Further, while there are existing systems for managing access to physical resources with a centrally managed identity provider, most of these are either cost prohibitive for consumer applications or are constrained to operate only for a subset of the public (e.g., government employee, corporate employees). A system that allows individuals to manage multiple credentials or tokens for multiple physical resources in their private life and commercial interactions using a single electronic identity is highly desirable.

SUMMARY OF THE INVENTION

The present invention solves the above problems and more, in part by leveraging one or more identities that an individual has already established with one or more electronic identity providers such as social media companies (e.g., Facebook, Google+), business communities (e.g., LinkedIn, Yammer, Salesforce.com), or free-standing identity providers (e.g., OneID, IDonDemand), for example. Because most classes of these identities are free to the consumer, and publically referenceable, they can be leveraged for physical access management through the present invention, which is capable of binding/unifying these identities to one or more of the many physical instantiations of credentials (which can be tokens including cards, barcodes, digital codes, etc.) that are used to authenticate access to buildings, homes, facilities, stadiums, vending machines, cages, cabinets, lockers, devices, public venues, and other real-world resources or points of service.

In addition, the present invention can make available the broader set of attires from the domain of social media services to physical access control systems, and vice versa. Currently, there exists no way to automatically connect or enable functionalities from one domain to the other as these two domains are separate and not connected. The present invention farther makes it possible to write new applications and features which leverage capabilities across each domain. In one embodiment, the present invention abstracts the features within each domain and makes them available for use in new applications developed within and in accordance with the present invention.

The present invention provides, in part, a type of gateway or proxy between outside party electronic identity providers such as social media services, on the one hand, and myriad physical resources that typically use localized access control methods that neither bind access management to any public identity nor provide longitudinal integrity or continuity of identity across discrete occurrences of an individual gaining access to the resource. In addition, the present invention provides additional service above and beyond gateway and proxy functions that enhance both the social media services and the physical access control systems between which they operate. Through standard application programming interfaces (APIs) published by each domain and by operating as a separate gateway or exchange, the present invention is able to make available the complete set of features bi-directionally to both the social media services and the physical access control systems.

In one embodiment, the present invention comprises two primary components: the Credentializing and Access Control System (CACS) and the Proxy and Gateway Control System (PGCS).

The Credentialing arid Access Control System (CACS) in accordance with the present invention is an access control management system which is used to control entry and exit of persons into buildings, parking facilities, airports, cabinets, cages, elevators, stadiums, job sites, and in general any enclosed, gated or locked physical structure, object or circumscribed space. In one embodiment of the present invention, the CACS can be generalized to encompass access management applications with any physical resource equipped with a credential reader and control circuitry as exemplified in the present application.

In the current context, a credentialing system is a computer system capable of receiving identity information and attribute assertions from an Identity Provider (IdP), generating tokens, linking identity information from the IdP to the credentials, and transmitting the credentials to at least one physical device (credential carrier) in a format appropriate to the credential reader at which the will be presented. In this context, an IdP is a system that creates, maintains, and manages electronic identity information for principals (users, services, or systems) and provides principal authentication to other applications and/or service providers (SPs) within a federation or distributed network. It is a trusted third party that can be relied upon by users and computer servers when users and computer servers are establishing a dialog that must be authenticated. The IdP sends an attribute assertion containing trusted information about the user to the SP.

The access control aspect of the CACS provides numerous administrative functions that allow administrators, building owners, homeowners and any other type of customer to control how and when persons are allowed to gain access to a point of service (e.g., building, enclosed space, etc.). The CACS of the present invention operates through a communications network to convey configuration data to on-premise control panels, which execute authentication and authorization algorithms and collect data about user events and other sensor inputs, including alarms, and transmit them back to the CACS.

A control panel is an electronic device consisting of processors, volatile and non-volatile memory, input and output circuits, relays, power supplies, network interfaces, alarm sounders, LED status indicators, and electronic tamper detection. The control panel operates by reading a token presented by an end user, through a reader, at the point of access and processing that credential through both authentication and authorization algorithms. The reader is an electronic device located at the point of service and is capable of interacting electronically with a plurality of token types through radio waves, as in the case of proximity cards, smart cards, near-field communication (NFC) tokens, and Bluetooth communications; direct electrical connection, as in the case of the contact interface to smart cards; visual and/or infrared spectrum light, as in the ease of barcode readers, cameras, and optical scanners; magnetic stripe readers; or through non-electronic means, such as manual keypad entries, gestures, biometrics, etc.

End user credential data can be registered with the CACS by manual means, such as web browser entry over a communications network, but may also be entered electronically through such mechanisms as file transfers, data uploads, and API calls from external computer systems. The tokens are associated by the present invention with a number of hierarchical and relational data structures such as accounts, sites, groups, access control lists, schedules, exclusions, notification rules, email addresses, phone numbers, physical addresses, employment data, and any of more than dozens of other textual and/or numerical fields which define additional user attributes.

Typically, these tokens are associated with users, but do not have any public reference beyond the scope of the individual system in which they are defined. In other words, each internal identity is an island. The situation is exacerbated by the fact that there are multiple standards for the physical tokens, and they are nor generally interoperable across the many systems that a user may encounter. Further, the tokens currently in use across the physical access control market are generated and manufactured without regard for uniqueness, which results in the duplication of many token values and the possibility of security breaches or misidentification of individuals.

In the present invention, the CACS is extended to bind its own internal database of identities and associated credentials or token values to one or more public identity providers. The internal record therefore becomes an index or pointer to an identity that has previously been established by a person with an entity external to the CACS. This identity is then linked to one or more instances of physical access control systems (also managed by the CACS) by further binding the identity to one or more tokens commonly used to gain access to restricted facilities, such as homes, offices, public venues, businesses, automobiles, etc, as described above. The uniqueness of an individual's electronic identity thus provides a further security layer to minimize, for example, the potential for duplication of ordinary token values that might otherwise result in security breaches or identity misidentification.

In accordance with one embodiment of present invention, the CACS determines the type of credential or token to be issued to the end user in any particular situation by knowing what type of infrastructure is available at the given facility. If, for example, the facility is known to have optical scanners controlling access, a barcode credential can be generated and sent to the user's mobile communications device. In another example, if the facility is known to have NFC readers controlling access, and the end user possesses a device capable of performing NFC interactions, an NFC code is sent to the end user's device. If the facility has only a keypad system for managing access, or if the end user is known to have text messaging capabilities only, and no NFC or capability of displaying a bar code, then a digital message (numerical code) is sent to the user's mobile device. As an alternative installation of the system of the invention, a standardized digital token type (e.g., bar code on a mobile communications device) can be used to drive greater consistency and uniqueness across the systems.

The CACS capability to provide one or more suitable tokens for one or more types of physical access control readers, along with the linkage to a single publicly referenceable identity, enables the end user to have authenticated access to multiple facilities that were previously discrete transactions that could not be connected to one another. One of the benefits to the end user is the ability to have managed access privileges at multiple facilities without needing separate identity verification at each one.

The Proxy Gateway Control System (PGCS) of the present invention service exchange system used to update and publish notifications between the social media service and the physical access control systems. In addition, the PGCS also serves as a new application development environment which leverages the existing features and services within both the social media services and physical access control systems.

DEFINITIONS

Security Token:
Security tokens (or simply tokens) are used to assert one's identity electronically (as in the case of a customer trying to access their bank account). The token is used in addition to or in place of a password to prove that the customer is who they claim to be. The token acts like an electronic key to access something. In the description of this invention, the terms "token" and "credential" used interchangeably, unless otherwise prescribed.

Security Application:

The Security Application is a computer program that executes on the credential carrier to (e.g., a mobile communications device) and enables it to interact through a computer network with the credentialing service arid one or more types of credential readers.

Bar Code:

A bar code is an optical machine-readable representation of data, including but not limited to: linear bar codes which represent data with lines of varying width and spacing, two-dimensional barcodes which represent data using dots, rectangles, hexagons and other geometric patterns. Quick-response codes, or QR codes, are a form of bar code contemplated herein.

DETAILED DESCRIPTION OR PREFERRED EMBODIMENTS

Figure 1:
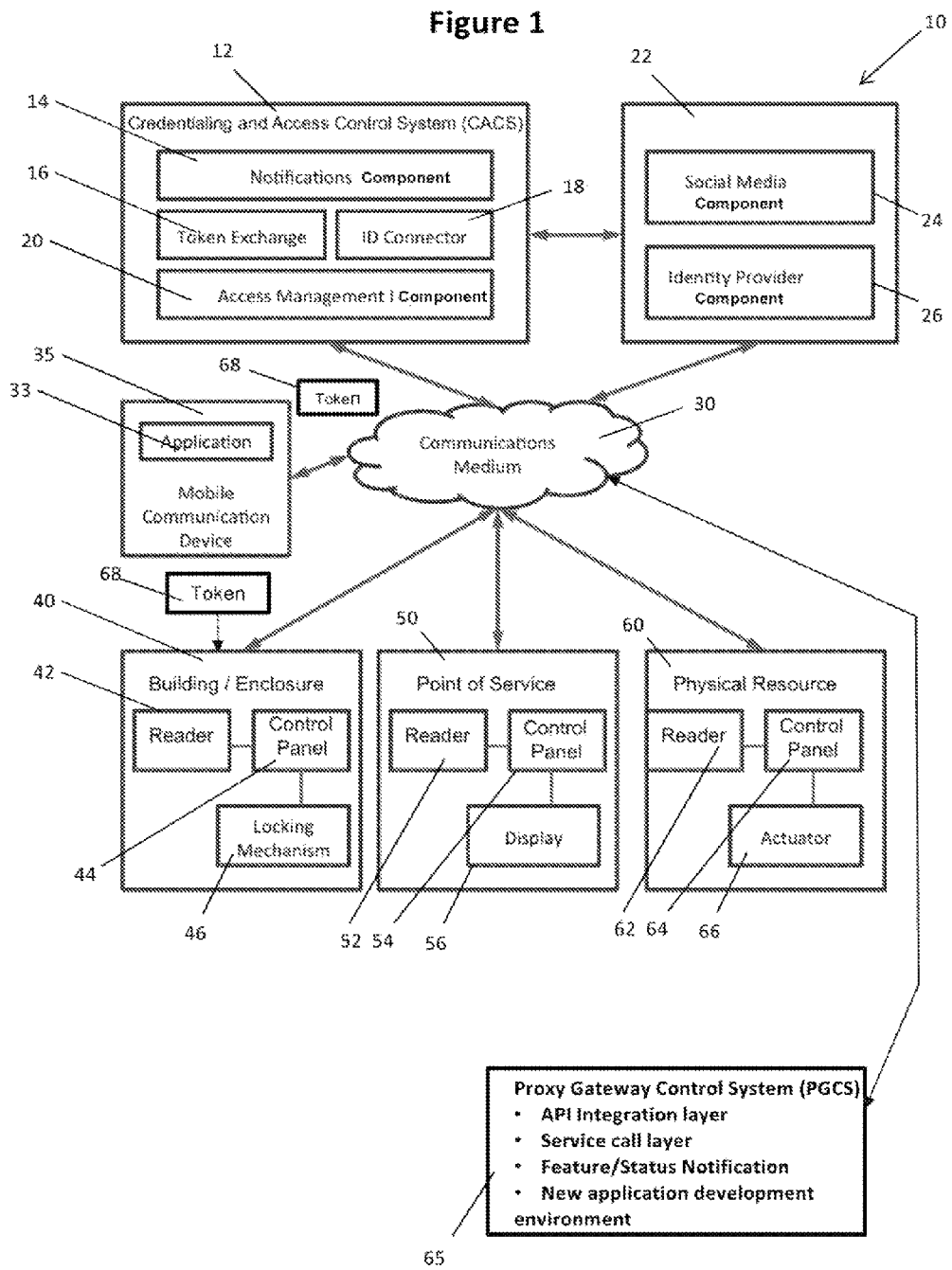
FIG. 1 is a schematic diagram of one embodiment of the system of the present invention.

As illustrated in FIG. 1, the Credentialing and Access Control System (CACS) 2 in accordance with one embodiment of the system 10 of the present invention provides an access control management system which is used to control entry and exit of persons into physical resources, such as, for example, buildings, parking facilities, airports, cabinets, cages, elevators, stadiums, job sites, and in general any enclosed physical structure or object or circumscribed space.

In one embodiment of the present invention, the CACS 12 is comprised of

Notifications Component 14, which communicates with a social media service or other outside electronic Identity Provider information regarding, for example, interactions with physical assets under access management.

Token Exchange Component 16, which performs many-to-many mappings between identities originated in an external IdP and the physical tokens used in the physical resources under management. The Token Exchange Component further creates new tokens and creates many-to-many mappings of the tokens to identities originated in an external IdP. It will be appreciated that by "generating" a token, the present invention contemplates generating as new token for an individual identity in connection with a physical resource, generating a new token for a specific physical resource that can be issued to multiple identities, and recalling a previously created token associated with a particular identity or physical resource.

ID Connector Component 18, which creates a binding between the internal identity representations of the CACS and the external identities provided by one or more IdPs or social media services.

Access Management Component 20, which provides a variety of services related to access management, including authentication, authorization, schedule management, user management, communications, cryptographic operations, administration, provision of user interlaces, etc.

In embodiments of the present invention, the access management component 20 is adapted to store configuration data pertaining to access requirements For a plurality of physical resources. The notifications component 14 is adapted to receive identity and authentication information pertaining to users, wherein the identity and authentication information is defined externally of the system, such as by the external electronic Identity Provider, for example. The token exchange component 16 is adapted to generate, for the user and based on the received identity information, various physical resource tokens, with each resource token permitting the user to access different physical resources according to the token type required at the resource. The token exchange component 16 or other component(s) can also be adapted to issue or send the token details (for example, encrypted/encoded hashes of token information) to a control panel for a physical resource in order to enable the control panel to accept valid credentials or tokens later received from a user. In embodiments of the present invention, the access management component is further adapted to send configuration instructions to the first and second physical resources so as to permit access to the at least one User Upon the receipt by the first physical resource or the first resource token, and upon receipt by the second physical resource of the second resource token. In embodiments of the present invention, the access management component is further adapted to determine, for each of the first and second physical tokens, an appropriate token to generate based upon the stored configuration data.

As further illustrated in FIG. 1, the system 10 of the present invention further comprises an outside Identity Provider 22, which is a public or private Identity Provider which optionally includes a social media component 24 or similar user-to-user connectivity, information exchange, and messaging services. An exemplar outside Identity Provider 22 is a Social Identity Provider that is further comprised of:

Social Media component 24, which supports user-to-user connectivity, information exchange, messaging services, group management, addition and deletion of users from groups, and APIs for interacting with such services programmatically.

Identity component 26, which provides a unique user identity for each user who is registered with the service, allows external systems to interact with it programmatically, provides authentication and single sign-on services.

A Communications Medium 30, such as the Internet, for example, can support electronic information exchanges between parties, systems and components pictured in FIG. 1. A user can access the CACS of the present invention using an application program 33 operating on as user computer, which can be a mobile communication device 35 shown in FIG. 1, for example. One example Of an access-managed entity involved in the operation of the system 10 is a building or enclosure 40, which has been equipped with at least one reader 42, at least one control panel 44, and at least one locking mechanism 46 which can be operated by the control panel.

Another example of an access-managed entity involved in the operation of the system 10 of the present invention is a generic point of service 50 such as a concert venue or sports stadium which has been equipped with at least one reader 52, at least one control panel 54, and at least one display 56 which can be operated by the control panel. A point of service 50 may further be a physical location at which a user is seeking access, authentication and authorization services in order to gain entry to a physical location, or to receive other services provided at that physical location. In the description of this invention, the terms "point of service" and "physical resource" may be used interchangeably, unless otherwise prescribed.

A further example of an access-managed entity involved in the operation of the system 10 of the present invention is a generic point of service 60 such as a turnstile, sending machine, cage, box, enclosure, circumscribed space, etc., which has been equipped with at least one reader 62, at least one control panel 64, and at least one actuator 66 which can be operated by the control panel.

The reader 42, 52, 62 in the above examples can be exemplified by an electronic device which is capable of interacting electronically with a token or credential carrier through radio waves, visual spectrum light (such as barcode readers or any other types of optical scanner) or other electromagnetic means; or receiving credentialing information that was transmitted to a credential carrier, and subsequently re-entered into the credential reader through non-electronic means, such as manual keypad, gestures, biometric identifier(s), etc. For example, reader devices on facilities can be one or more of keypads, in which case the token is translated and expressed as a series of letters and/or digits and transmitted to the credential carrier; bar code scanners, in which case the credential carrier displays a visual bar code transmitted from the credentialing service and communicates it to the reader using visual scanning of the bar code; at Bluetooth™ device, in which case the credential carrier interacts with the reader using Bluetooth communications; near-field communications (NFC) readers, in which ease the credential carrier interacts with the reader using radio waves and protocols defined in the NFC standard.

A credential carrier in accordance with the present invention can be exemplified as an electronic device which is capable of obtaining as credential (or security token) 68 by communicating through a computer network with the credentialing service and conveying the token to a local reader for the purposes of authentication and authorization. Optionally in accordance with the present invention, credential carriers can further be one or more of: cell phones or other mobile communications devices equipped with a security application, or otherwise capable of displaying a machine readable image (e.g., bar code) or token that has been sent via email, text or other means, and serves as a credential or token; tablet devices equipped with a security application, or otherwise capable of displaying a visual image of the token that has been sent via email, text or other means; paper or other non-electronic physical representation of a token such as printed bar codes; any user device which can import and store authentication information for multiple resources, applications and/or services including but not limited to fob, dongle, smart card, access card, badge, or other form of easy to carry article; a mobile communication device, such as a cell phone, tablet, PDA, or any other electronic device capable of communicating with the communications network and exchanging data with the CACS; an application residing on the mobile communication device that manages interactions with the CACS and the readers, among other tasks; and a static credential, such as RFID, proximity, fob, or barcode which does not communicate with the network and cannot be altered. Credentials or tokens can be sent from the CACS to the credential carrier using Communications Medium 30 or other forms of communication including wireless signals associated with a telecommunications service that does not employ the Internet, for example.

Optionally, a token in accordance with the present invention can be one or more of: a digital code; a visual representation of a digital code; and a digital code embedded in a physical device. Further, tokens can be sent from one credential carrier to another; however, security precautions can be established according to the individual identities or physical resources involved as appropriate. For example, a physical resource in the form of a group vacation rental may permit a single token to be issued to a single identity associated with the present invention, but may also permit the single identity recipient of the single token to forward the token by e-mail, text or other means to other identities, wherein the other identities may or may not be registered with the system of the present invention. By contrast, a physical resource in the form of a lock box may not permit a single token issued to a single identity to be forwarded and successfully used by another identity to open the lock box. In such an instance, additional security in the form of authenticating the single identity to which the token was issued may be required so as to prevent another identity to which the token was forwarded from gaining access to the lock box. Alternatively, appropriate programming can be employed to represent any forwarded token as such, which may prevent the forwarded token from being used to access the lock box.

The Proxy Gateway Control System (PGCS) 65 is a service exchange system used to update and publish notifications between the Identity Provider 22 and the CACS 12. While the PGCS is indicated in FIG. 1 as being accessible through communications network 30, it will be appreciated that PGCS 65 can be arranged architecturally as an intermediary directly connected to the CACS 12 and the Identity Provider 22 via a virtual private network (VPN) for example. In addition, the PGCS also serves as a new application development environment which leverages the existing features and services within both the social media services and physical access control systems.

Figure 2:
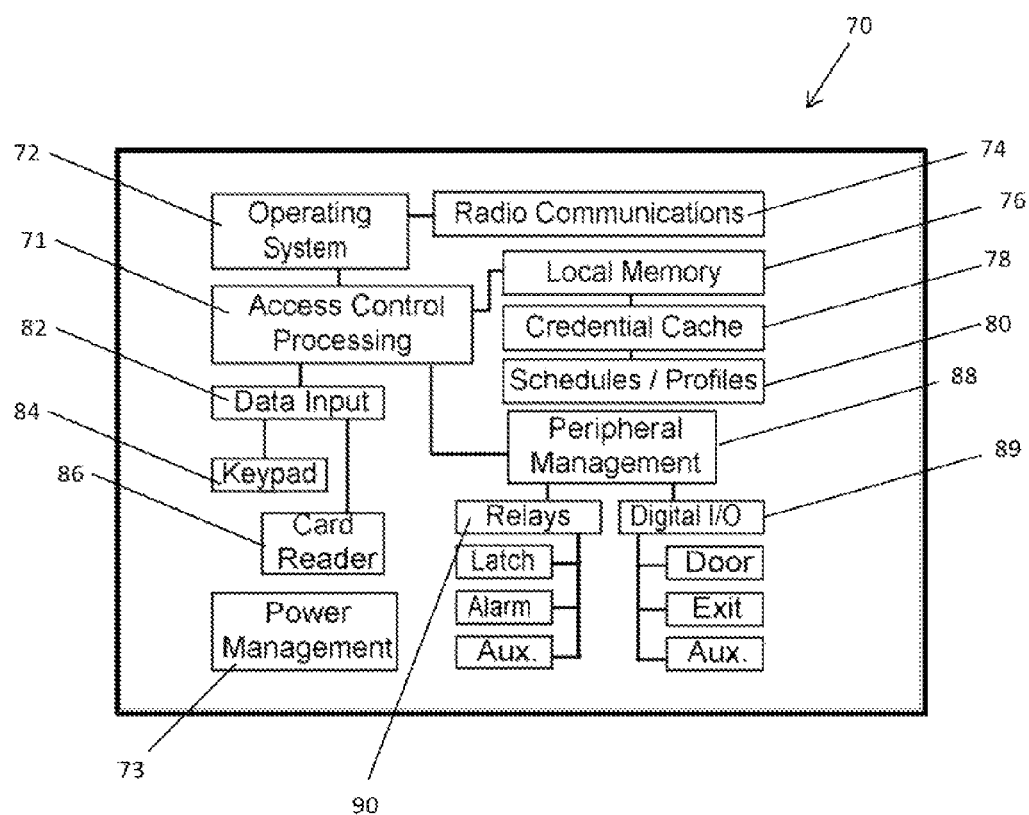
FIG. 2 is a schematic diagram illustrating functional components of an electronic control panel in accordance with one embodiment of the present invention.

As illustrated in FIG. 2, an exemplary electronic control panel 70 in accordance with the present invention is shown comprising one or more microprocessors 71 with custom firmware to support processing of authentication and authorization requests, maintain schedules and a real-time clock, perform encryption functions as necessary, and communicate with the communications network. The control panel 70 can further comprise elements such as, for example, a real-time operating system 72, which provides a hardware abstraction layer and program execution environment; it power management component 73, a communication module 74, which supports both wireless and wired communications through one or more communications networks; local memory 76, consisting of both volatile RAM and non-volatile electronic memory for long-term data storage; a credential cache 78, which stores encrypted hashes of tokens/token values in order to provide rapid response time to authentication requests, and to provide autonomous operation (potentially degraded) when there is a failure of the communications network; schedules 80, which are digital representations of blocks of time, either recurring or non-recurring, which govern when credentials and other select operations may be performed; input modules 82, for a multiplicity of peripheral readers, including keypads 84, proximity and smart card readers 86, NFC and RFID readers, etc.; and a peripheral management component 88 for managing digital input/output components 89 and relays 90 for direct control of electromechanical devices, where applicable, as in the case of controlling access to doors, turnstiles, cages, or other devise with electromechanical locking systems. It will be appreciated that, while encryption or encoding of tokens may be desirable for security purposes, alternative embodiments of the present invention can operate without the use of encryption or encoding.

Operational Examples

Figure 3:
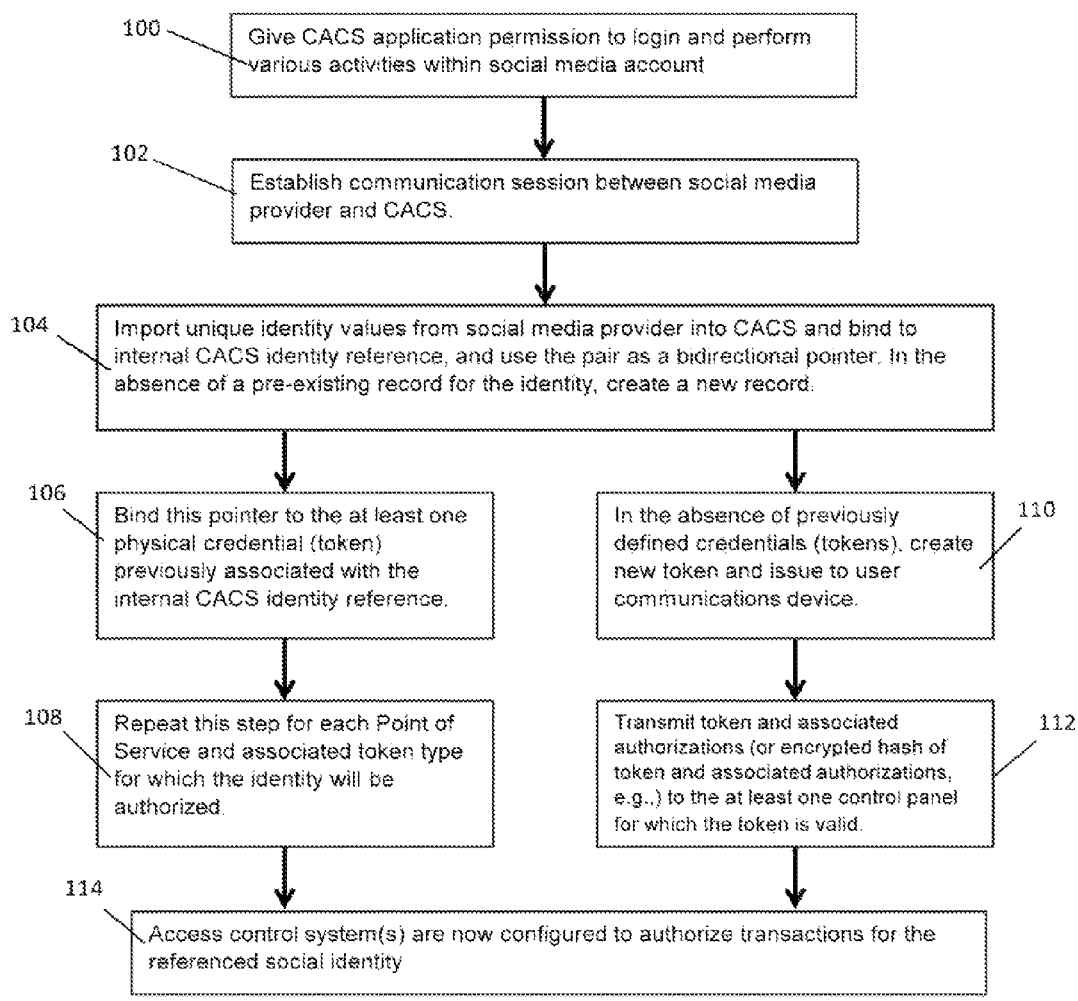
FIG. 3 is a flow diagram illustrating identity import, merge, and token binding processes in accordance with one embodiment of the present invention.

The sequence in FIG. 3 provides an example of one method by which the initial identity binding between the internal CACS identity records and one or more external ID providers takes place in accordance with one embodiment of the present invention. The use case illustrated in FIG. 3 is for the situation where the "owner" of the physical resource is also the "user" of the one or more physical resources. As shown in FIG. 3, and as indicated at step 100, a user/owner first provides the CACS of the present invention with permission to login and perform various activities within an electronic identity provider account (e.g., social media account) of the user, accessed via Identity Provider 22. It will be appreciated that the user in this example will have previously established an electronic identity with login credentials with an entity qualifying as an IdP, and will further have previously established access control capabilities with one or more physical resources. The user can access CACS via application program 33 operating on a user computing device, such as a mobile communications device 35, for example. At step 102, the CACS 12 then establishes a communication session with Identity Provider 22. At step 104, the CACS imports one or more unique identity values from Identity Provider 22 into CACS 12 and binds the one or more identity values to an internal CACS identity reference (e.g., previously established by the CACS), and thereafter uses each pair as a bidirectional pointer. The CACS uses the CACS identity reference for CACS-side operations and the Identity provider 22 uses the unique identity value(s) from the Identity Provider 22 for Identity Provider-side operations. In the absence of a pre-existing record for the identity, the present invention can create a new record during this step. At step 106, the CACS 12 can bind the established pointer to the at least one physical credential (token) previously associated with the internal CACS identity reference, and at step 108, this process can be repeated for each point of service and associated token type for which the identity will be authorized. In the absence of previously defined tokens, one or more new tokens can be created by CACS 12 at step 110 and issued to a user communications device (e.g., device 35 FIG. 1). At step 112, an encrypted hash of token can be created by the CACS along with associated authorizations, which can thereafter be sent to the at least one control panel (e.g., 44, 54, 64 in FIG. 1) for which the token is valid. As noted above, encrypting, hashing and/or encoding may or may not take place during these processes depending upon the embodiment of the present invention employed, and the given requirements for as particular implementation of the present invention. At step 114, the access control system(s) are now configured to authorize transactions for the referenced electronic identity.

Figure 4:
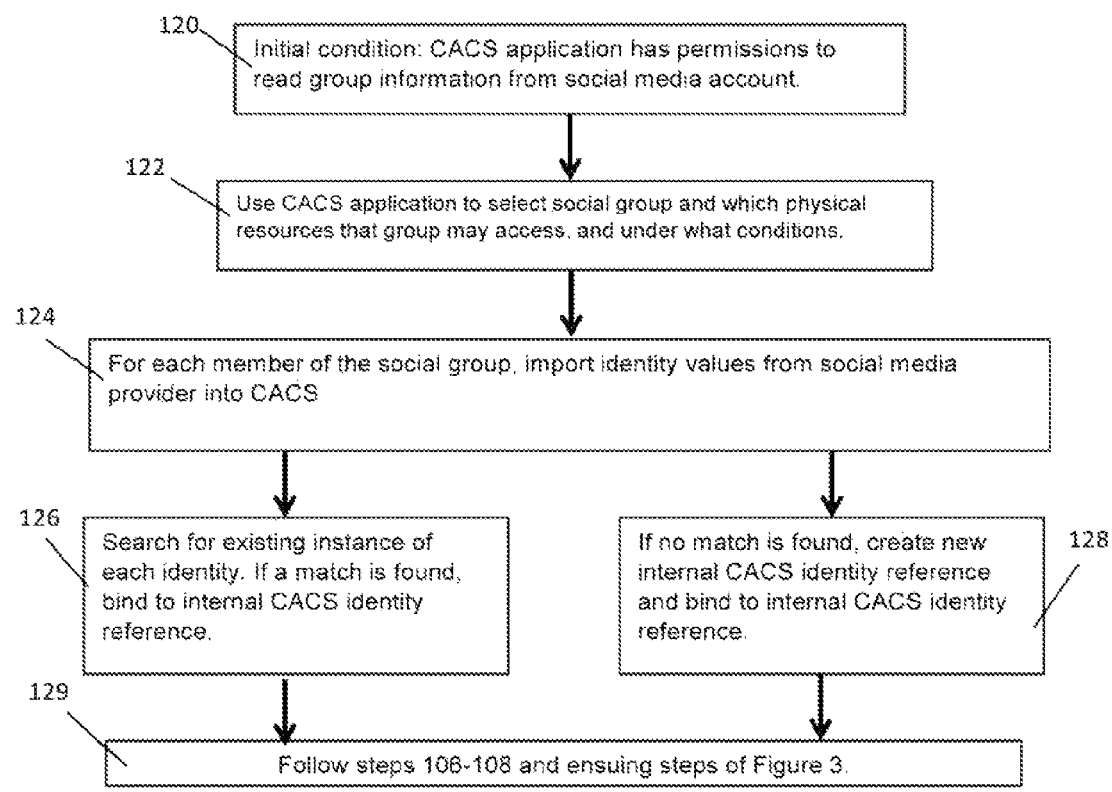
FIG. 4 is a flow diagram illustrating a method of authorizing social groups for physical resources in accordance with one embodiment of the present invention.

The sequence in FIG. 4 provides an example of one method for using social networks to rapidly construct authorization frameworks for access to physical resources in accordance with one embodiment of the present invention. As shown in FIG. 4, and as at step 120, it will be appreciated that, as an initial condition, the CACS 12 has permissions to read group information from a user's electronic identity (e.g., social media) account. At step 122, the user can access and use CACS 12 to select one or more social groups and which physical resources that group may access, and under what conditions. For instance, a user may desire family members in one social group to be able to access a house via a garage reader, may further desire for social sports team members to be able to access a reserved gym, and may further desire for a neighbor to be able to access a locked storage facility in which the user has stored personal items. As at step 124, for each member of the different social groups, the CACS can import identity values from Identity Provider 22 into CACS 12. At step 126, the CACS can search for an existing instance of each identity associated, respectively, with each member of the different social groups. If a match is found, it can be bound to its associated specific internal CACS identity reference during this step. If no match is found, CACS can create a new internal CACS identity reference and bind it to the electronic identity value for the individual at step 128. At step 129, the process can return to steps 106 and 108 of FIG. 3 for each user and point of service involved in the initial user's request.

Figure 5:
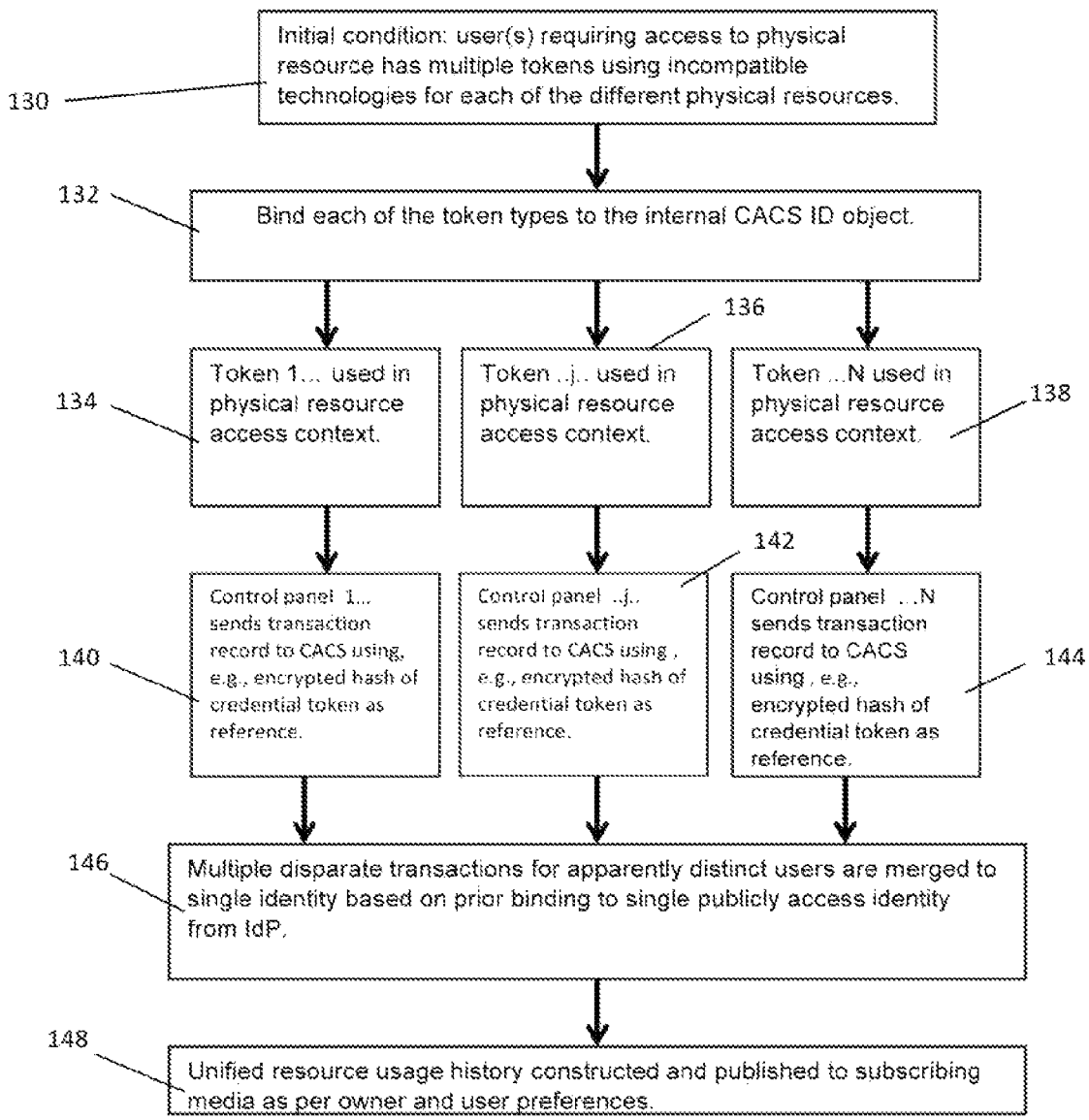
FIG. 5 a flow diagram illustrating a method for binding an external identity to multiple access tokens in accordance with one embodiment of the present invention.

The sequence in FIG. 5 provides an example of one method by which multiple token types and instances are mapped back to a single identity and used to construct a coherent history of resource usage in accordance with one aspect of the present invention. As shown in FIG. 5, and as at step 130, it will be appreciated that, as an initial condition, user(s) requiring access to one or more physical resources have multiple tokens using incompatible technologies for each of the different physical resources. At step 132, the CACS binds each of the established token types to the internal CACS ID object to create a bidirectional pair. At steps 134, 136 and 138, different tokens are used in physical resource access contests over time. At steps 140, 142 and 144, the respective control panels associated with the different accessed physical resources send respective transaction records to CACS using, for example, an encrypted hash of respective tokens as a reference. In this way, and at step 146, multiple disparate transactions for apparently distinct users are merged to a single identity based on the prior binding to a single publicly access identity foul IdP, in accordance with this aspect of the present invention. At step 148, the CACS can construct and publish a unified resource usage history to subscribing media as per owner and user preferences. For example, the CACS can produce reports for user review regarding statistical measures associated with access control of the different physical resources in accordance with this process.

Figure 6:
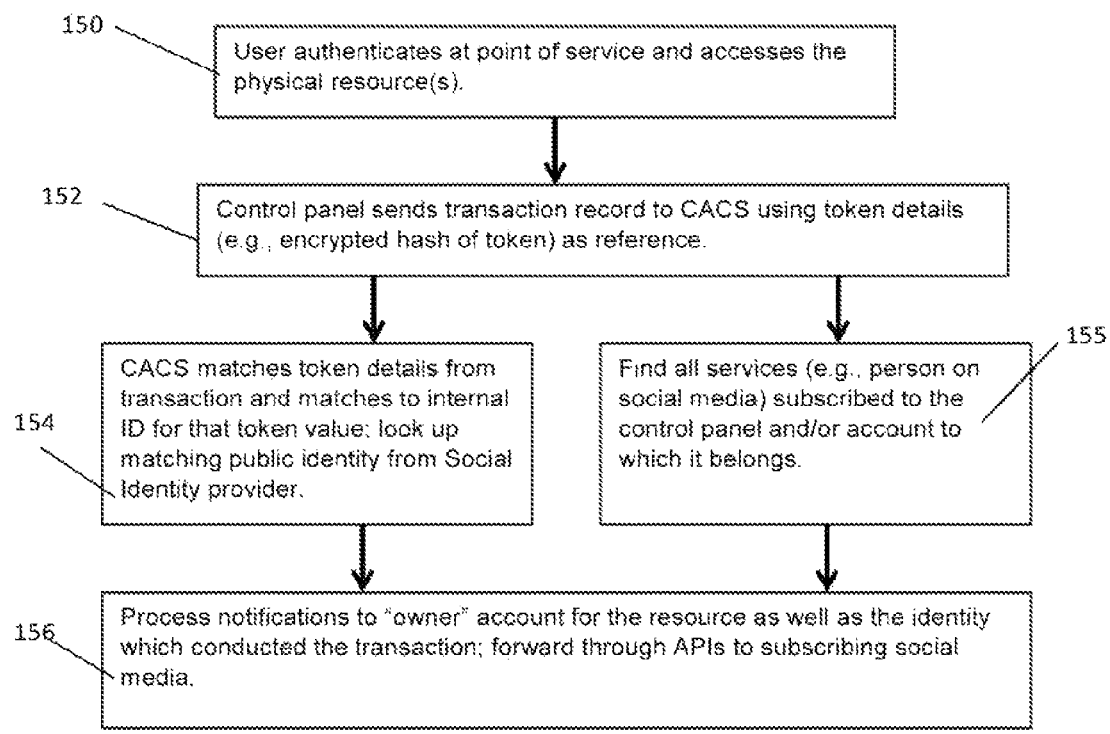
FIG. 6 is a flow diagram illustrating a method for credential usage and social notification in accordance with one embodiment of the present invention.

The sequence in FIG. 6 provides an example of one method by which resource usage is communicated back through a social media service to provide the "owner" account a coherent history of all authorized transactions against owned resources, in accordance with one aspect of the present invention. As shown in FIG. 6, and as indicated at step 150, a user first authenticates at a given point of service and accesses the physical resource(s) associated therewith. At step 152, the control panel associated with the point of service then sends a transaction record to CACS 12 using, for example, at encrypted hash of the credential token as a reference. At step 154, CACS 12 matches the encrypted hash from the transaction to the appropriate internal ID for that token value, and then looks up the matching public identity from electronic Identity Provider 22. At step 155, the CACS finds all services (e.g., person on social media) subscribed to the control panel and/or account to which it belongs. At step 156, CACS process notifications to the "owner" account for the resource as well as the identity that conducted the transaction, and can then forward through appropriate APIs to subscribing social media.

In one aspect, the present invention can also adapt to incorporate additional features and functions provided by internal or external resources. For example, one or more users can opt in to allow third party service providers to provide complementary or "situation-based" service offerings to users and the individuals comprising a user's social graph via the electronic Identity Provider 22. As an example, in the instance a user provides for family members to have access to a vacation home using their social identities and associated credentials, a third party service provider can, using the present invention (and subject to appropriate permissions), learn when different users may arrive, and offer grocery, cleaning, equipment, entertainment and other services to the arriving users. Such offerings can occur, for example, through e-mail, text messaging and other common forms of alerts from the third party to the individual involved. In one embodiment, third party service offerings can be provided before, during and/or after a visitor has used the specific physical resource involved.

Further, the services can be customized based upon user characteristics as provided to the third party and/or as already associated with the various users of the present invention. Such information can be designated via electronic Identity Provider 22, in one embodiment of the present invention. For example, a user with a previously identified profile as a surfing enthusiast may receive offers tied to discount surfing equipment rental when visiting a beach vacation area, whereas a fishing enthusiast would receive different alerts customized to fishing interests.

As a further example, the present invention can be employed in law enforcement and other surveillance activities. For example, assume a user of the system of the present invention is required to employ a biometric feature in order to access a given physical resource in California, and the same user is also known by the present invention to have access to as bank safe in Florida. Further, assume that a theft of assets from within the bank safe in Florida occurs on a Tuesday at 9 a.m. If the user has accessed the California resource at or near the same time as the theft, then the user can be removed as a possible suspect in the Florida bank safe theft, thereby having an electronic alibi.

In carrying out the above, it will be appreciated that the system of the present invention can comprise a computer-based system, where the components can be implemented in hardware, software, firmware, or combinations thereof.

Users can access the system of the present invention using client computing devices, such as desktop computers, laptop computers and mobile communications devices (MCDs), for example. It will be appreciated that the system of the present invention can incorporate necessary processing power and memory for storing data and programming that can be employed by the processor(s) to carry out the functions and communications necessary to facilitate the processes and functionalities described herein. Each client computing device can be configured to communicate with an application server (not shown) of the system described herein. Appropriate encryption and other security methodologies can also be employed by the system of the present invention, as will be understood to one of ordinary skill in the art.

Unless otherwise stated, devices or components of the present invention that are in communication with each other do not need to be in continuous communication with each other. Further, devices or components communication with other devices or components can communicate directly or indirectly through one or more intermediate devices, components or other intermediaries. Further, descriptions of embodiments of the present invention herein wherein several devices and/or components are described as being in communication with one another do not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, at least one processor (e.g., a microprocessor or controller device) receives instructions from a memory or like storage device that contains and/or stores the instructions, and the at least one processor executes those instructions, thereby performing a process defined by those instructions. Further, programs that implement such methods and algorithms can be stored and transmitted using a variety of known media.

Common forms of computer-readable media that may be used in the performance of the present invention include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP). Bluetooth, GSM, CDMA, EDGE and EVDO.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art.

It will be apparent to one skilled in the art that any computer system that includes suitable programming means for operating in accordance with the disclosed methods also falls well within the scope of the present invention, including such systems as may be offered in as cloud computing environment. Suitable programming means include any means for directing a computer system to execute the steps of the system and method of the invention, including for example, systems comprised of Processing; units and arithmetic-logic circuits coupled to computer memory, which systems have the capability of storing in computer memory, which computer memory includes electronic circuits configured to store data and program instructions, with programmed steps of the method of the invention for execution by a processing unit.

Aspects of the present invention may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example. Appropriate hardware, software and programming for carrying out computer instructions between the different elements and components of the present invention are provided.

The present disclosure describes numerous embodiments of the present invention, and these embodiments are presented for illustrative purposes only. These embodiments are described in sufficient detail to enable those skilled in the art to practice the invention, and it will be appreciated that other embodiments may be employed and that structural, logical, software, electrical and other changes may be made without departing from the scope or spirit of the present invention. Accordingly, those skilled in the art will recognize that the present invention may be practiced with various modifications and alterations. Although particular features of the present invention can be described with reference to one or more particular embodiments or figures that form a part of the present disclosure, and in which are shown, by was of illustration, specific embodiments of the invention, it will be appreciated that such features are not limited to usage in the one or more particular embodiments or figures with reference to which they are described. The present disclosure is thus neither a literal description of all embodiments of the invention nor a listing of features of the invention that must be present in all embodiments.

It will thus be appreciated that at least one aspect of the present invention provides a system and method for linking an individual's digital identity front an outside Identity Provider, such as a social media service, to a plurality of physical or digital token types that enable access to a resource. This system and method can involve providing a CACS as described above, which can communicate with, and receive instructions and/or information from one or more users and one or more IdP's as described above.

In operating this system and method, it will be appreciated that one or more physical tokens can be generated on-the-fly and transmitted to the individual via a computer network. In one embodiment of the present invention, the token can be one of: a bar code, a string of alphanumeric characters, a proximity card, an NFC code. Further, in operating this system and method, the token can enable authentication to one or more physical resources, including facilities or buildings, such as private residences or commercial properties. Such resources may be considered "dwellings" for purposes of the present disclosure in the sense that an individual gaining access may physically reside within the confines of the resource, whether outdoors or indoors. In one embodiment of the present invention, the token can enable authentication to one or more containers or enclosed spaces, such as a lockbox, locker, locked cage, cabinet, or any other space enclosed by an electronically activated locking mechanism. In one embodiment of the present invention, the token can serve as a "pass" to an event or service. In another embodiment of the present invention, the system can further de-credentialize individuals according to user instructions. In yet another embodiment of the present invention, users of the Identity Provider 22 can enhance their social media personage based on their participation in accessing physical resources using the CACS of the present invention. For example, a user who agrees to have his or her social identity bound to an internal CACS identity reference for purposes of gaining accessibility to a physical resource, can be rewarded with elements such as loyalty points, privileged access to social media resources and other types of rewards and enhancements.

It will further be appreciated that, in one embodiment of the present invention, a system and method are provided for linking and transmitting data from physical access control events (usage of the credential) back to the public identity or social media service. In this embodiment, event data can be transmitted to the social media service and appear in the history or personal page of the individual or organization that granted access to the resource. Further, the event data can be transmitted to the social media service and appears in the history or personal page of the individual or organization who accessed to the resource.

It will further be appreciated that, in one embodiment of the present invention, a system and method are provided for mapping the social relationships created within the individual's social media account to access privileges. In this embodiment, all the members of a group on the social media service can be granted access permissions.

It will further be appreciated that, in one embodiment of the present invention, a system and method are provided for enabling an organization with an account on a social media service to grant access permissions to its members via their relationship to the organization within the social media service.

The invention claimed is:

1. A control panel for controlling access to a physical resource, comprising:
   an electronic reader for reading at least one required token;
   at least one processor and computer software, written on non-transitory computer readable media and containing instructions stored in a memory and executable by the processor to:
   receive configuration instructions from a centralized access control management system controlling access to at least a first physical resource, wherein the first physical resource requires a first token type, wherein the centralized access control management system maintains at least one binding between at least one internal identity and identity and authentication information from at least one electronic identity provider that is external to the access control management system, wherein the instructions pertain to the at least one required token for permitting access the first physical resource, wherein the instructions further executable for processing the receipt of identity and authentication information from at least one user derived from the external identity provider and the reading of the at least one required token in order to permit access to the first physical resource.

2. A system, comprising:
   at least one processor, and
   at least one memory storing instructions that, when executed by the at least one processor, cause the system to:
   receive, by a credentialing and access control system, identity and authentication information associated with at least one internal identity from at least one electronic identity provider that is external to the credentialing and access control system, based on permission granted by at least one user;
   generate at least a first physical resource token for permitting physical access to a first physical resource;
   associate the first physical resource token with the at least one internal identity;
   receive, by the credentialing and access control system and from the at least one user, identity and authentication information derived from the external identity provider that is associated with the at least one internal identity;

receive, by the credentialing and access control system, an indication of interaction of the first physical resource token with the first physical resource; and grant access to the first physical resource.

3. The system of claim 2 wherein the instructions further cause the system to send configuration instructions to the first physical resource so as to permit access upon the receipt by the first physical resource of the first resource token.

4. The system of claim 2 wherein the received identity and authentication information is defined through an outside party electronic identity provider, wherein the credentialing and access control system receives the identity and authentication information associated with the at least one internal user based on permission granted by the at least one internal user, wherein the credentialing and access control system receives at least one condition from a first physical resource access owner for the at least one user to access it first physical resource, wherein the credentialing and access control system receives an indication that the at least one user has met the at least one condition.

5. The system of claim 4, wherein the credentialing and access control system associates the generated first physical resource token with the at least one user and receives an indication of interaction of the first physical resource token with the first physical resource.

6. The system of claim 2 wherein the first resource token is communicated to a mobile communications device.

7. The system of claim 2 wherein the first and second resource tokens are taken from the group consisting of: a barcode, an NFC tag, a proximity card, an alphanumeric string, a biometric instruction, a proximity signal, a computer network, a radio signal.

8. The system of claim 2 wherein the instructions further cause the system to receive identity information for a second user from the at least one first user, and generate a first resource token for the second user.

9. The system of claim 2 wherein the instructions further cause the system to receive and store activity data from a physical access event for the at least one user tied to the first or second physical resource.

10. A method, comprising:
providing at least one processor and computer software, written on non-transitory computer readable media and containing instructions stored in a memory and executable by the at least one processor to:
receive, by a credentialing and access control system, identity and authentication information associated with at least one internal identity from at least one electronic identity provider that is external to the credentialing and access control system, based on permission granted by at least one user;
generate at least a first physical resource token for permitting physical access to a first physical resource;
associate the first physical resource token with the at least one internal identity;
receive, by the credentialing and access control system and from the at least one user, identity and authentication information derived from the external identity provider that is associated with the at least one internal identity;
receive, by the credentialing and access control system, an indication of interaction of the first physical resource token with the first physical resource; and
grant access to the first physical resource.

11. The method of claim 10 wherein the instructions further cause the system to send configuration instructions to the first physical resource so as to permit access upon the receipt by the first physical resource of the first resource token.

12. The method of claim 10 wherein the received identity and authentication information is defined through an outside party electronic identity provider, wherein the credentialing and access control system receives the identity and authentication information associated with the at least one internal user based on permission granted its the at least one internal user, wherein the credentialing and access control system receives at least one condition from a first physical resource access owner for the at least one user to access a first physical resource, wherein the credentialing and access control system receives an indication that the at least one user has met the at least one condition.

13. The method of claim 12, wherein the credentialing and access control system associates the generated first physical resource token with the at least one user and receives an indication of interaction of the first physical resource token with the first physical resource.

14. The method of claim 10 wherein the first resource token is communicated to a mobile communications device.

15. The method of claim 10 wherein the first and second resource tokens are taken from the group consisting of: a barcode, an NFC tag, a proximity card, an alphanumeric string, a biometric instruction, a proximity signal, a computer network, a radio signal.

16. The method of claim 10 wherein the instructions further cause the system to receive identity information for a second user from the at least one first user, and generate a first resource token for the second user.

17. The method of claim 10 wherein the instructions further cause the system to receive and store activity data from a physical access event for the at least one user tied to the first or second physical resource.

* * * * *